United States Patent

Gasiunas

[15] 3,681,577
[45] Aug. 1, 1972

[54] AUTOMATIC CALIBRATION APPARATUS

[72] Inventor: Donatas V. Gasiunas, Massapequa Park, N.Y.

[73] Assignee: Technicon Instruments Corporation, Tarrytown, N.Y.

[22] Filed: Oct. 30, 1970

[21] Appl. No.: 85,538

[52] U.S. Cl..............235/151.3, 73/1 R, 235/151.13, 356/82
[51] Int. Cl.............................................G06f 15/46
[58] Field of Search.........235/151.13, 151.3, 151.35, 235/197; 356/82; 324/13, 71 R; 73/1 R, 23, 23.1; 23/255 E, 258.5; 340/347 AD

[56] References Cited

UNITED STATES PATENTS

| | | | |
|---|---|---|---|
| 3,398,285 | 8/1968 | Sachs | 356/82 X |
| 3,504,521 | 4/1970 | Luckers | 73/1 R |
| 3,521,272 | 7/1970 | James | 340/347 AD |
| 3,488,583 | 1/1970 | Foster | 324/71 R X |

*Primary Examiner*—Malcolm A. Morrison
*Assistant Examiner*—Jerry Smith
*Attorney*—S. P. Tedesco and Stephen E. Rockwell

[57] ABSTRACT

New and improved apparatus are provided for the automatic calibration of automatic, multiple channel sample analysis means and comprise level set means to automatically control the level of the analysis means analog output signals and maintain the latter within the same general operating range, zero set means to automatically determine the background signal level for each analysis channel and subtract the same from the analysis channel output signal, attendant the conversion thereof to digital form, and calibration means to vary the scale factor involved in said signal conversion in accordance with the operating characteristics of each of said analysis channels.

13 Claims, 7 Drawing Figures

FIG. 2A

GAIN STEPS IF GAIN X1000 IN FIRST STEP IS NOT NEEDED

FIG. 2B

GAIN STEPS IF GAIN X1000 IN FIRST STEP IS NEEDED

AUTOMATIC CALIBRATION APPARATUS

BACKGROUND OF THE INVENTION

1. Field of the Invention

This invention relates to new and improved apparatus for the highly accurate, rapid, and fully automatic calibration of automatically operable, multiple channel sample analysis apparatus.

2. Description of the Prior Art

Although a wide variety of calibration and like apparatus are currently available for the calibration of automatic, multiple channel sample analysis means, it may be understood that, in general, none of the same are operable in highly accurate, rapid and fully automatic manner. This is to say that, in most instances, human skills will be seen to be relied upon for critical calibration apparatus adjustments and the like to thereby introduce the factor of the possibility of human error with attendant question as to the validity of the sample analysis results. Too, it is believed clear that many of the currently available, automatically operable sample analysis apparatus are of particularly complex construction and manner of operation, and are very fast-acting, whereby the even partially manual calibration thereof with the requisite high degree of accuracy becomes an extremely demanding and tedious task to thus even further increase the possibility of human error with attendant invalidity of the analysis results.

OBJECTS OF THE INVENTION

It is, accordingly, an object of this invention to provide new and improved apparatus for the rapid fully automatic and highly accurate calibration and the like of automatic sample analysis apparatus.

Another object of the invention is the provision of apparatus as above which are fully self-adjusting and utilize a human operator only as a data source to the apparatus to thereby remove the possibility of human error from the apparatus adjustment procedure.

Another object of the invention is the provision of apparatus as above which are operable to automatically set a generally common output signal level for automatic, multiple channel sample analysis apparatus to enable operation of the output signal processing means in a generally linear range; to automatically determine the background signal magnitude for each analysis channel and subtract it from the analysis channel output signal in said signal processing means, and to automatically calibrate said signal processing means for each of said analysis channels in accordance with standard samples of known characteristics.

A further object of the invention is the provision of apparatus as above which require the use of only readily available analog and digital components of proven dependability in the fabrication thereof to thereby provide for substantially maintenance-free apparatus operation.

A still further object of the invention is the provision of apparatus as above which are particularly adaptable for use in conjunction with automatic sample analysis means of the nature disclosed in application for U.S. Pat., Ser. No. 59,401, filed July 30, 1970, now U.S. Pat. No. 3,655,288 and assigned to the assignee hereof.

SUMMARY OF THE INVENTION

As disclosed herein, the new and improved, automatic calibration apparatus of the invention comprise analog-digital signal processing apparatus which are operable in conjunction with automatic, multiple channel sample analysis apparatus taking the form of simultaneous, multielement atomic spectroscopy analysis means to calibrate the same.

More specifically, the apparatus of the invention comprise level set cycle means which include multiplexed switched gain amplifier and integrator means, and related analog comparator and digital memory components, which are operable to determine and set the gain for each analysis channel in such manner that the analog portion of the apparatus can operate in the linear region.

Further included are zero set cycle means which comprise A/C converter and rate multiplier means and are operable to determine the level of the background signal as caused by flame noise, reflected flame radiation, electrical offsets and the like, for each analysis channel, and to effect the subtraction thereof from the sample analysis signal for said analysis channel attendant signal conversion to analog form.

Also included are calibration cycle means which utilize said A/D converter and rate multiplier means, and operatively associated digital comparator means, and function to adjust the gain of said A/D converter for each analysis channel to effect the calibration of said channels in accordance with a standard of known multielement concentration. This is accomplished by varying the scale factor or multiplier used in the conversion of said sample analysis signals from analog to digital form by said A/D converter for each of said analysis channels.

DESCRIPTION OF THE DRAWINGS

The above and other objects and advantages of the invention are believed made clear by the following detailed description thereof taken in conjunction with the accompanying drawings wherein.

DETAILED DESCRIPTION OF THE INVENTION

Figure 1:
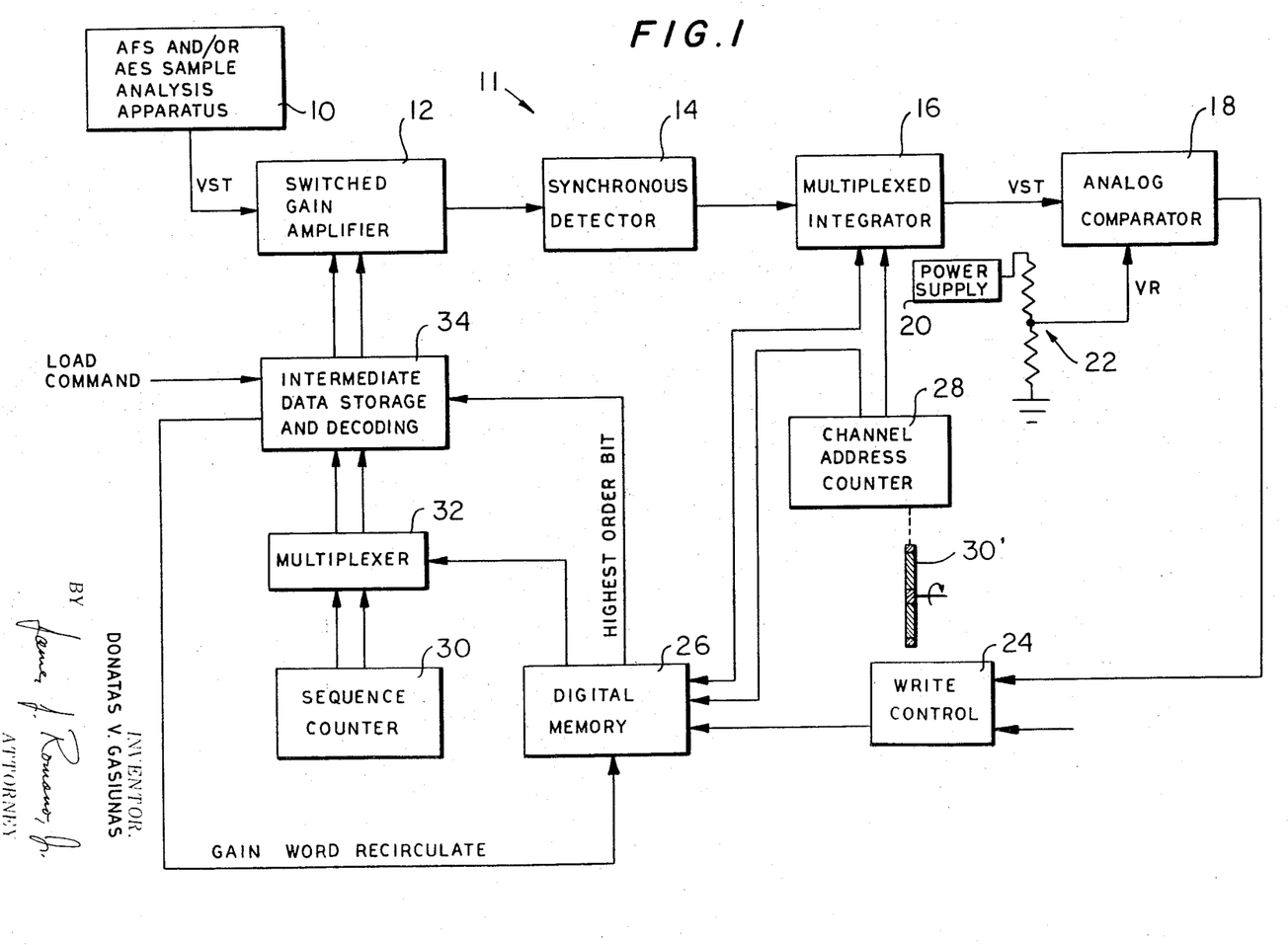
FIG. 1 is a block diagram illustrating the level set cycle of the apparatus of the invention.

Referring now to FIG. 1, atomic spectroscopy sample analysis apparatus are indicated schematically at 10 and may, for example, take the form of those shown and described in the copending application for United States Patent of Lee M. Lieberman and Robert T. Schuman entitled "New And Improved Optical System For Use In Automatic, Simultaneous Multielement Atomic Spectroscopy Sample Analysis Apparatus", Ser. No. 59,401, filed July 30, 1970, now U.S. Pat. No. 3,655,288 and assigned to the assignee hereof. In operation, as briefly described, it may be understood that the analysis apparatus 10 are operative to quantitatively analyze each of a series of sample solutions with regard, for example, to six different atomic species or metallic constituents thereof through atomic fluorescence spectroscopy (AFS) and/or atomic emission spectroscopy (AES), and to provide on six channels a total of six output signals for further electronic signal processing and subsequent read-out, it being understood that each of said output signals is indicative of the quantity of a different one of said metallic constituents in the sample solution then under analysis.

In a typical analysis situation as exemplified by the analysis of a series of lubricating oil or blood samples with regard to six metallic constituents thereof by AFS and AES, it may be understood that the respective output signal magnitudes will vary greatly in accordance with the widely different sample constituent concentrations and/or in accordance with whether AFS or AES is utilized to provide the output signal. Accordingly, and if each of said output signals is subsequently amplified at the same level or gain, desirable operation of the analog portion of the latter in the linear region may be rendered impossible.

A block diagram illustrating the automatic setting of the level or gain for each of said six output signal channels to bring the same within the same linear range is identified generally at 11 in FIG. 1. Said level or gain setting means are operable attendant the introduction of a standard solution having known constituent concentrations to the analysis apparatus 10 to provide standard output signals VST of substantially predetermined magnitude in each of the six output signal channels. These output signals are applied as indicated to a switched gain amplifier 12 which comprises an AC amplifier having unity of X1000 gain, and a DC amplifier having nine small incremental or X2 gain steps.

A synchronous detector is indicated at 14 and is connected as shown to the output of amplifier 12. A multiplexed integrator is indicated at 16 and comprises a common integrator amplifier and six storage capacitors, there being one of the latter for each output signal channel. The integrator 16 is connected to the output of the synchronous detector 14 although it may be understood that the latter is bypassed for AES output signals as is the AC amplifier of switched gain amplifier 12. An analog comparator taking the form, for example, of an operational amplifier is indicated at 18 and connected as shown to the output of the multiplexed integrator. A power supply is indicated at 20 and is operable to provide a constant voltage through voltage divider 22 for application as a constant reference voltage VR to the analog comparator 18.

A write control clock is indicated at 24 and digital memory means are indicated at 26. The digital memory means comprise a level set cycle storage slot of five bit position capacity for each of the six analysis means channels. The output of the analog comparator 18 is applied as shown to the write control clock 24, while the pulse output of the latter is applied as indicated to the digital memory means 26.

A channel address counter is shown at 28 and is controlled in synchronism with the sequential analysis channel operation of the analysis means 10 to insure the performance of the level set cycle procedure in synchronism therewith. This control may be effected, for example, by the operative connection of an analysis apparatus component in the nature of the rotatable filter wheel 30 to said channel address counter, it being understood that the rate of rotation of said filter wheel is, of course, synchronized with the overall rate of operation of the analysis apparatus 10.

The output of the channel address counter is applied as indicated to each of the multiplexed integrator 16 and the digital memory means 26, while the latter two components are additionally operatively associated as indicated.

Sequence counter shift register means are indicated at 30 and are operatively connected as shown to multiplexer means which are indicated at 32; while intermediate data storage and decoding means are indicated at 34 and are operatively connected as shown intermediate said multiplexer means and the switched gain amplifier 12. The intermediate data storage and decoding means 34 are operative to control the gain settings of the respective AC and DC amplifiers of the switched gain amplifier 12 through control of the connection of the respective amplifier feedback resistors in the respective amplifier circuits. The highest order bit information for each analysis channel slot from the digital memory means 26 is applied as indicated directly to the intermediate data storage and decoding means 34, while the gain word from the latter is recirculated and applied as indicated to the input of said digital memory means for possible writing therein under the control of the write control clock 24 as described in detail hereinbelow.

Prior to commencement of the automatic level or gain setting procedure, the digital memory means 26 is erased by the writing of all "zeros" therein and the sequence counter 30 is reset to effect the presentation of the highest order bit to the multiplexer means 34 for each analysis channel. Operation is then commenced, attendant the aspiration and flow of the standard through the analysis means 10, by the introduction of the highest order bit from the sequence counter means 30 to the multiplexer means 32. This results in the application from the latter of a "one" in the first bit position to the intermediate data storage and decoding means 34 with resultant introduction of the first step or X1000 gain setting into the AC amplifier of the switched gain amplifier 12 leaving the gain of the nine gain step DC amplifier at unity.

With this gain setting in switched gain amplifier 12, the multiplexed integrator 16 is cycled through all six analysis channels under the control of the channel address counter 28 and a standard voltage VST collected on each integrator storage capacitor for each analysis channel. At the completion of this integration step, the integrator 16 is re-addressed and the standard voltage VST1 for the first analysis channel taken from the integrator and compared in analog comparator 18 to the reference voltage VR. If it assumed, for example, that VST1 is a particularly strong signal which, in any event is greater than VR, the write control clock 24 will be inhibited by the comparator 18 to prevent the writing of the gain word 10000, which has been recirculated from the intermediate data storage and decoding means 34 to the input of the digital memory means 26, into the analysis channel one slot of the latter. As a result all "-zeros" will remain in the memory slot for analysis channel one.

Following this the standard voltage VST2 for analysis channel 2 is taken from the multiplexed integrator 16 and compared to the reference voltage VR in the analog comparator 18. Assuming, for example, that VST2 is a particularly weak signal which is, in any event, smaller than VR, the write control clock 24 will be enabled by the analog comparator 18 to write the gain word 10000, again as recirculated from the intermediate data storage and decoding means 34, into the analysis channel two slot in the digital memory means 26. This procedure is repeated for the remaining analysis channels three through six, inclusive, to determine the highest order bit for the gain word for the respective digital memory means slots corresponding thereto. At the completion of this procedure, it may be understood that the connection of the write control clock 24 to the highest order bit storage cell of the respective analysis channel slots digital memory means 26 is inhibited to prevent alteration of said highest order bit during subsequent gain step determination.

Figure 2A:
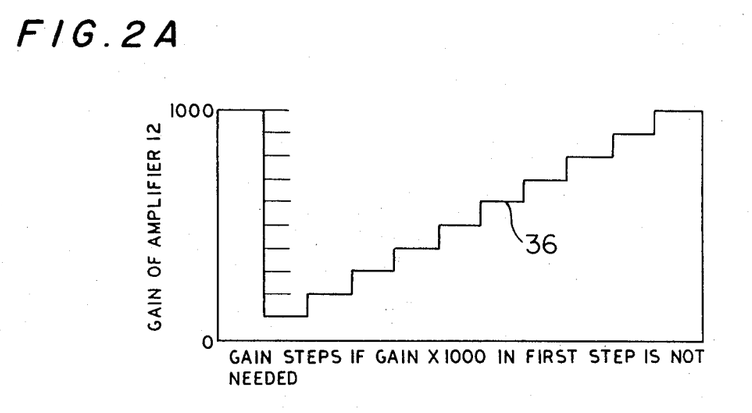
FIGS. 2A and 2B are graphs illustrating different gain setting determination sequences for the switched gain amplifier of the apparatus of the invention.
Figure 2B:
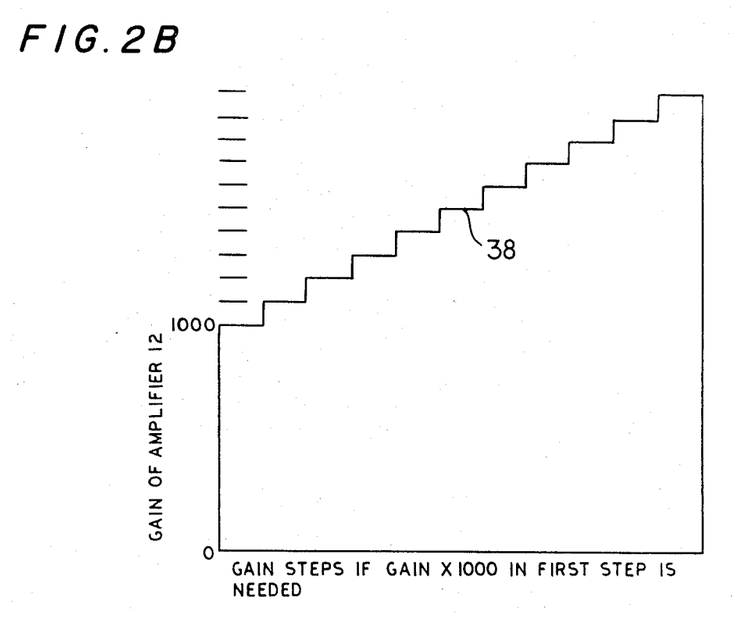

The establishment of the gain setting of the AC amplifier of the switched gain amplifier 12 which will be utilized for each of analysis channels one through six is then effected by the sequence counter means 30 sequencing the respective gain settings in the manners made clear by FIGS. 2A and 2B. More specifically, and recalling now that the X1000 gain step was not needed for analysis channel one as indicated by the graph 36 of FIG. 2A, it may be understood that the sequence counter 30 will start with the smallest incremental (X2) gain step for the DC amplifier while the gain of the AC amplifier remains at unity. Conversely, it will be recalled that the X1000 gain step was needed for analysis channel two as indicated by the graph 38 of FIG. 2B, whereby may be understood that the sequence counter 30 will commence the sequencing of the DC amplifier from that overall gain level of the switched gain amplifier.

As each incremental or X2 gain step is introduced by the sequence counter 30, the analysis channel standard voltage VST provided by the switched gain amplifier 12 in response thereto is integrated as described by the multiplexed integrator 16 for each of the analysis channels. Following this, said integrator is readdressed by the channel address counter 28 and the respective stored analysis channel voltages compared in turn with the reference voltage VR in the analog comparator 18. In each instance, writing of a "one" into the appropriate analysis channel slot bit position in the digital memory means 26, to effect subsequent utilization of the X2 gain setting then under test, will only be permitted by the write control clock 24 if the relevant analysis channel standard voltage VST remains less than the reference voltage VR. Thus is believed made clear that the last gain setting or five bit gain word written into each analysis channel slot in the digital memory means 26 will be the closest proper gain setting available, within the limitations of the overall available switched gain amplifier gain variations, for use in the relevant analysis channel during normal sample analysis operation of the sample analysis means 10.

Figure 3:
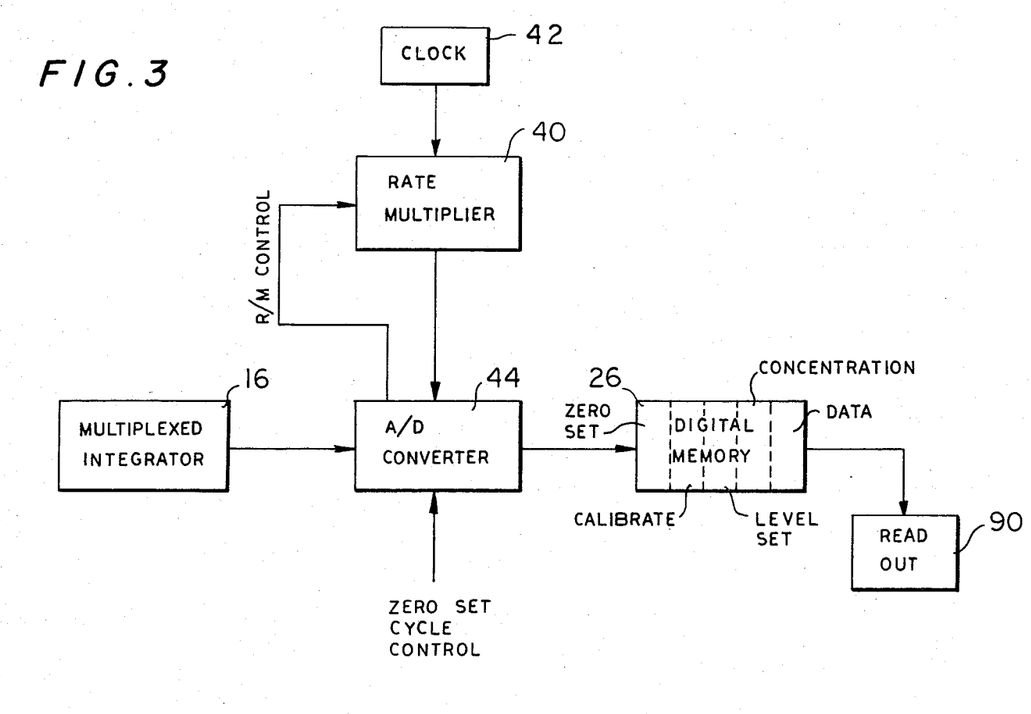
FIG. 3 is a block diagram illustrating the zero set cycle of the apparatus of the invention.

A block diagram illustrating the automatic operation of a zero set cycle to determine the total magnitude of the background signal VB, which may include electrical system offsets, signals due to irradiation reflections, signals due to impurities in the low cal standard, flame noise and the like, is shown in FIG. 3, it being understood that said background signal must, of necessity, be subtracted from the overall sample analysis signal attendant normal operation in order to insure the accuracy of the provided analysis results.

Referring now in greater detail to FIG. 3, it may be seen that the multiplexed integrator is again indicated at 16 and the digital memory means again indicated at 26, although it will be clear to those skilled in this art that a different, or zero set section, of the latter will be utilized for effecting the zero set cycle.

A rate multiplier is indicated at 40 and a clock at 42 with the output of the latter applied as shown to said rate multiplier. An analog/digital or A/D converter is indicated at 44, and a zero set cycle control input is applied thereto as indicated. The respective outputs of the multiplexed integrator 16 and the rate multiplier 40 are applied as indicated to the A/D converter 44, while the output of the latter is applied as indicated to the digital memory means 26. In addition, a rate multiplier control signal is applied as indicated from the A/D converter 44 to the rate multiplier 40.

Figure 4:
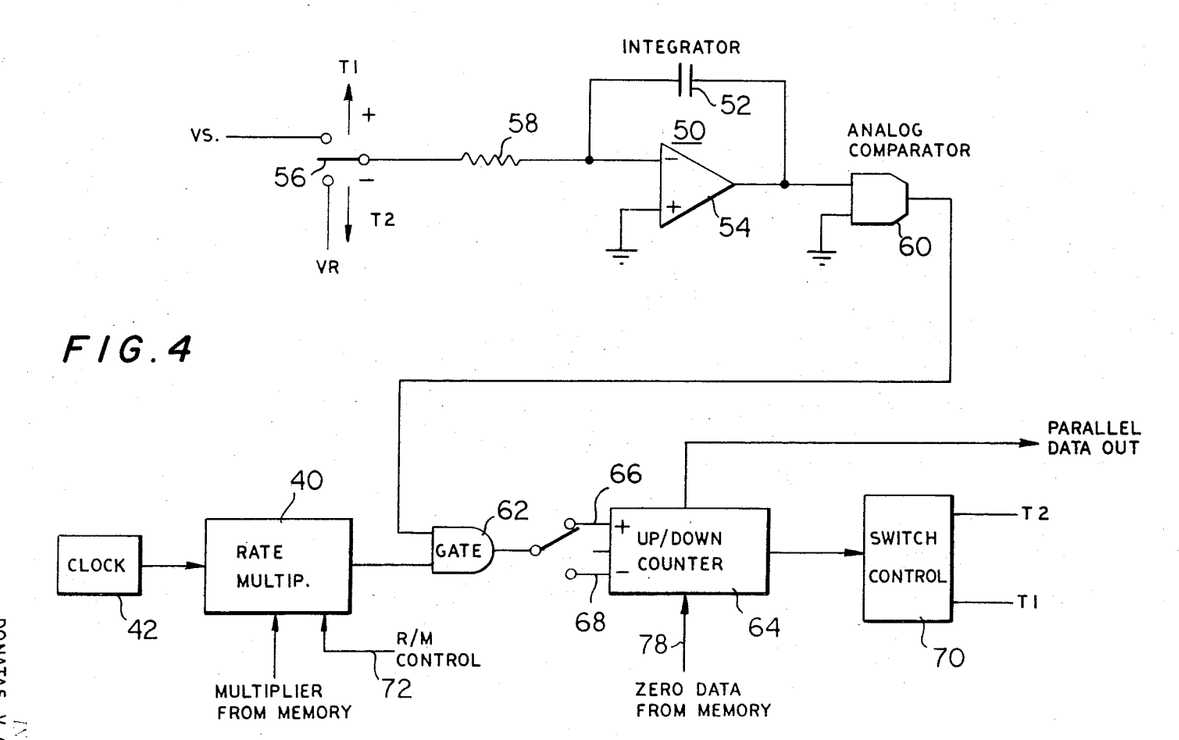
FIG. 4 is a block diagram depicting the A/D converter of the apparatus of the invention.

The A/D converter is depicted in somewhat more detail in FIG. 4 and, as seen therein, comprises an integrator 50 including capacitor 52 connected as shown across operational amplifier 54. A two position switch is indicated at 56 and is operable in the upper position thereof as illustrated to apply the positive signal voltage VS through resistor 58 for a time T1 to charge the integrator capacitor 52. In the lower position thereof as indicated the switch 56 is operable to apply a negative reference voltage −VR to said capacitor for a time T2 to discharge the same.

An analog comparator is indicated at 60 and the output of integrator 50 is applied thereto as shown.

An "and" gate is indicated at 62 with one input thereof being constituted by the output of analog comparator 60, and the other input thereof by the output from rate multiplier 40.

A BCD coded up/down counter is indicated at 64 and comprises a positive or signal voltage VS input 66 and a negative or reference voltage VR input 68, respectively.

Switch control means are indicated at 70 and are operable, under the control as indicated of the BCD coded up/down counter 64, to control the operation of switch 56 for times T1 and T2.

In operation for background signal magnitude determination for each of the six analysis channels of interest, it may be understood that a zero concentration standard is aspirated for flow through the analysis means 10 to thereby theoretically provide a signal voltage VS of zero in each of the six analysis channels. Accordingly, whatever voltage does occur during such operation may be considered as caused by background and is thus identified as VB. For background magnitude determination, it may be understood that up/down counter 64 is initially forced to count up at a "standard" clock rate as supplied from rate multiplier 40 under the control of the rate clock 42.

Figure 5:
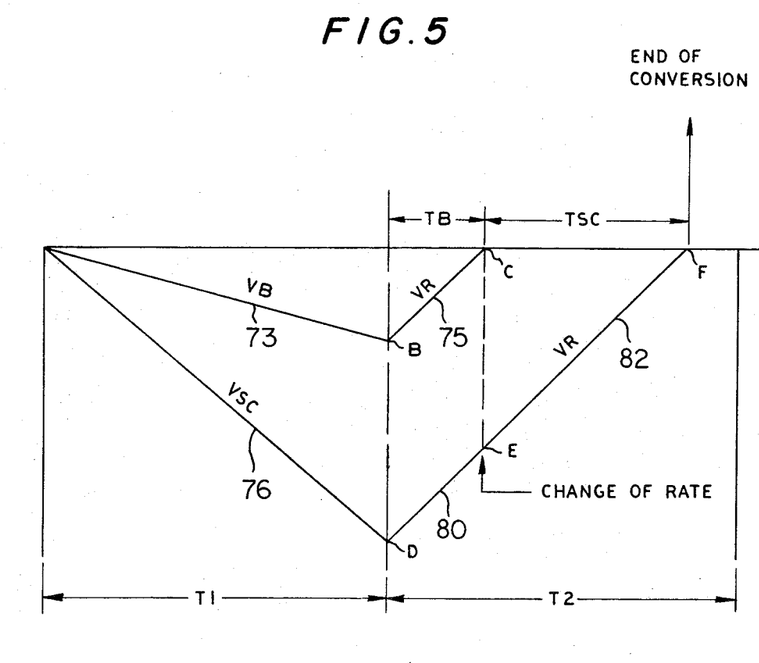
FIG. 5 is a timing diagram for the A/D converter of FIG. 4.

Referring now to the A/D converter timing diagram of FIG. 5, and considering the determination of background magnitude for analysis channel one, it may be understood that the channel one storage capacitor of the multiplexed integrator 16 (FIG. 1) which has, of course, been charged to substantially VB1, is addressed by the channel address counter 28 for application of VB1 through switch 56 to capacitor 52 of integrator 50 (FIG. 4) to charge the latter. Concomitantly, the up/down counter 64 counts upwardly from the all "zeros" state thereof at said standard clock rate until the counter is full, or contains all "ones", at which time the counter elapses and returns to all "zeros" to thus determine time T1. This is clearly illustrated by the curve 73 of FIG. 5, it being understood that the slope of said curve will, of course, be dependent upon the magnitude of VB1 since the resistance of resistor 58 and the capacitance of integrator capacitor 52 are respectively constant. Thus the disposition of point B will also be dependent upon VB1.

At the expiration of time T1, switch 56 will be switched to the constant negative reference voltage VR for application thereof through resistor 58 to begin the discharge of integrator capacitor 52 with concomitant commencement of the counting up, again at said standard clock rate, of the up/down counter 64 from the all "zeros" state thereof as indicated by the curve 75 in FIG. 5. The slope of curve 75 is, of course, constant in accordance with the constancy of the reference voltage VR.

The completion of the discharge of the integrator capacitor 52 and reduction of the charge thereon to zero, as indicated at crossover point C in FIG. 5, is sensed by the analog comparator 60 which functions to then discontinue operation of the up/down counter 64. Accordingly, the time TB1 which was required to discharge integrator capacitor at a standard clock rate by VR from VB1 is clearly established as indicated in FIG. 5, and this time TB1, in terms of a count CB1 at said standard clock rate, will remain accumulated in the up/down counter 64 for transfer as indicated on a parallel data out line into storage in the analysis channel one background voltage slot in the zero set section of the digital memory means 26. Following this, VB 2 is applied as described through switch 56 to commence the charging of integrator capacitor 52, and up/down counter 64 returned to the all "zeros" state thereof to commence the up count to determine point B for VB2.

This procedure is, of course, repeated in turn as described for each of the remaining analysis channels two through six whereupon each of the six analysis channel slots of the zero set section of the digital memory means 26 will contain a count CB which is precisely indicative of the magnitude of the background voltage VB in said analysis channel.

Figure 6:
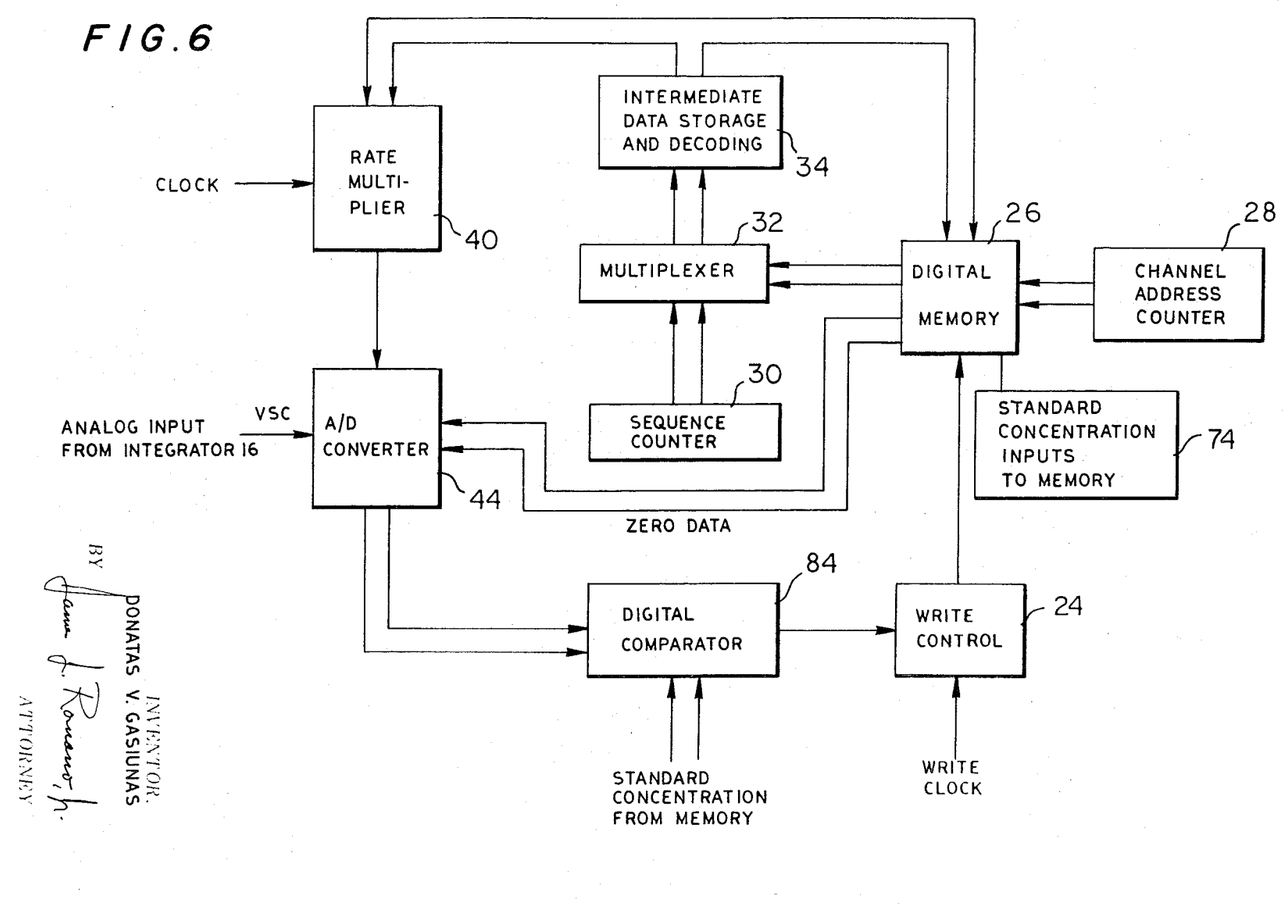
FIG. 6 is a block diagram illustrating the calibration cycle of the apparatus of the invention.

A block diagram illustrating the substantially automatic operation of a calibration cycle to calibrate the apparatus of the invention is shown in FIG. 6, it being understood that said calibration cycle is effective to insure that the concentration readings provided by the apparatus of the invention in response to the analysis by analysis means 10 of a standard solution of known constituents concentrations, are in accordance with said concentrations.

Briefly described, the calibration cycle is effected through use of the rate multiplier control or multiplication factor control wire 72 (FIGS. 4 and 6) to override the standard clock rate and change the frequency of the rate multiplier 40 thereby forcing the same to put out a pre-selected, non-standard rate. This change in rate or frequency of the rate multiplier 40 is utilized to form a multiplier word for each analysis channel for storage in each analysis channel slot of a calibration section of the digital memory means 26, and repeated use thereof as a scale adjustment or scale factor with regard to the operation of up/down counter 64 to effect calibration during sample analysis operation of the sample analysis operation of the sample analysis apparatus 10.

More specifically, it may be understood that, for calibration, a standard solution of known constituents concentration is flowed for analysis through the analysis apparatus to provide voltage signals VSC at the multiplexed integrator 16 (FIG. 1) which should be indicative of said known concentrations.

Standard concentration input means are indicated at 74 and are operative, as through the manipulation of non-illustrated thumb switches or the like, to load a standard concentration word for the constituent of interest into each analysis channel slot of a standard concentration section of the digital memory means 26. In addition, all six analysis channel slots in a calibrate or multiplier word section of said digital memory are cleared.

The above having been accomplished, it may be understood that the multiplexed integrator 16 is addressed by the channel address counter 28 to apply VSC1 to the A/D converter 44.

The application of VSC1 to the A/D converter 44 will be effective to cause up/down counter 64 to count at the standard clock rate from all "zeros" to all "ones" in time T1 as indicated by the curve 76 in FIG. 5, it being recalled that the counter will elapse at the expiration of time T1, as indicated at point D, to return to the all "zeros" state thereof. As this occurs, the background signal count CB1 for analysis channel one is withdrawn from the analysis channel one slot in the zero set section of the digital memory 26 and applied to the up/down counter 64 as indicated on line 78 (FIG. 4) to force the same to count down to the value of said background signal count. Following this, and the application of the negative reference voltage VR to the integrator capacitor 52 (FIG. 4) the up/down counter operates to count back up to the all "zeros" state thereof at the standard clock rate as indicated by curve 80 and arrives at said state at point E.

As point E is reached, the highest order bit from the analysis channel one slot in the calibrate section of the digital memory 26 is introduced as the multiplier word 100000000000 from the sequence counter 30 to the rate multiplier 40 on rate multiplier control wire 72 via multiplexer 32 and intermediate data storage and decoding means 34. This, of course, establishes a new count rate, and said up/down counter proceeds to count up in response to the continued application of the negative reference voltage VR from the all "zeros" state thereof at this new rate as indicated by curve 82 until the discharge of integrator capacitor 52 is complete as indicated at the cross-over point F, whereupon operation of the counter will be discontinued. Thus, a time TSC1, in terms of a count CSC1, will remain in the up/down counter 64.

Following this, the count CSC1 is applied from the A/D converter 44 to a digital comparator as indicated at 84. Concomitantly, the standard concentration word for analysis channel one from the standard concentration section of the digital memory 26 is also applied as indicated to said digital comparator.

The operation of the digital comparator is such that if the count CSC1 is greater than said standard concentration word, writing of the highest order bit of the multiplier word in the analysis channel one slot of the calibration section of the digital memory is inhibited by the write control clock 24. Conversely, if CSC1 is smaller than or equal to said standard concentration word, writing of said highest order bit in the digital memory 26 will be permitted.

Thereafter, the sequence counter 30 will effect the introduction from intermediate data storage and decoding means 34 of the following or next highest order bit as the multiplier word as described for application to the rate multiplier 40 to again change the multiplier rate or frequency in accordance therewith as described at point E (FIG. 5), it being understood that the voltage signal VSC1 for analysis channel one is still being applied to the A/D converter 44. For this procedure, it may be understood that if the highest order bit was previously accepted as described and written in the digital memory, the same will be shifted out of the latter for combination with this next or second highest order bit for application as the multiplier word which, in this instance, would, for example, be 110000000000.

Each remaining bit position of the twelve bit multiplier word in question is tested in turn as described for analysis channel one with the resultant determination of the full multiplier word or scale factor for said analysis channel and storage of said multiplier word in the analysis channel one slot of the calibration section of the digital memory 26.

Following this, the multiplexed integrator 16 is readdressed and the voltage VSC2 for analysis channel two applied to the A/D converter 44 for use in the determination as described of the multiplier word for analysis channel two and storage thereof in the analysis channel two slot of the calibrate section of the digital memory 26. Thereafter, the multiplier words for analysis channels three through six are determined as described in that order for storage in the appropriate memory section slots. As a result, it is believed made clear that each of the analog analysis channel output signals is varied, in accordance with the relevant analysis channel multiplier word or scale factor, attendant the conversion thereof to digital form in the A/D converter.

In overall operation for simultaneous, multielement sample analysis by AFS and AES, it may be understood that as the voltage signal for analysis channel one, which is indicative of the unknown concentration of the constituent being analyzed for in said channel, is applied to switched gain amplifier 12, the gain of the latter will be automatically adjusted by level set cycle operation to bring the level of said signal within the desired operation range. Following this, the application of said signal to A/D converter 44 will result in the automatic subtraction of the analysis channel one background signal therefrom by operation of the zero set cycle, the automatic calibration of said A/D converter by modification as described of the gain thereof concomitant with the processing thereby of the analysis channel one voltage signal of interest, and the provision of a thusly corrected and calibrated count which is accurately indicative of the constituent concentration of interest by said A/D converter. This count is preferably applied to the analysis channel one slot of an analysis data section of the digital memory 26 for subsequent read-out therefrom by read-out means 90 (FIG. 3) which may, for example, take the form of a digital printer. Processing of the voltage signals from analysis channels two through six, which are respectively indicative of the unknown concentrations of the constituents being analyzed for therein, is accomplished in turn in the same manner for the sample under analysis in synchronism with the operation of the analysis apparatus 10.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In apparatus for the calibration of multiple channel sample analysis means which are operable to provide a sample analysis output signal in each of a plurality of channels for each sample being analyzed, means operatively associated with said sample analysis means to automatically determine the background signal included in each sample analysis output signal channel, means to automatically subtract said background signal from each sample analysis output signal provided in said channel, means to automatically determine a calibration factor for each of said sample analysis output signal channels, and means to automatically apply said calibration factor to each sample analysis output signal provided in said channel, said output signals being provided in analog form, and said means to subtract the background signal for each of said sample analysis output signal channels comprising A/D converter means to convert said output signals and said background signals to digital form, and means to subtract the background signal for a particular sample analysis channel from each output signal from said channel attendant the conversion of said output signal to digital form.

2. In apparatus as in claim 1 wherein, said means to automatically apply said calibration factor to said output signals comprise, means to apply said calibration factor for a particular sample analysis channel to said A/D converter means to vary the gain thereof attendant the conversion thereby of said output signals from said channel to digital form.

3. In apparatus as in claim 1 wherein, said A/D converter means comprise up/down counter means which are operable to convert said output signals and said background signals to digital counts, and wherein said background signal is subtracted from said output signal by appropriate count subtraction.

4. In apparatus as in claim 3 wherein, said means to apply said calibration factor to said A/D converter means comprise means to vary the count rate of said up/down counter means attendant the conversion thereby of said output signals to digital form.

5. In apparatus as in claim 4 wherein, said means to vary the count rate of said up/down counter means comprise, rate multiplier means operatively associated with said up/down counter means to control the count rate thereof, and means to vary the rate provided by the former in accordance with said calibration factor.

6. In apparatus as in claim 3 wherein, said means to determine said background signal for each of said sample analysis channels comprise, means to apply a sample analysis output signal of substantially zero magnitude to a said channel, and means to apply the resultant signal in said channel to said up/down counter means for conversion to a digital count.

7. In apparatus as in claim 1 wherein, said A/D converter means comprise up/down counter means which are operable to convert said output signals to digital counts, and said means to supply said calibration factor to said A/D converter means comprise means to vary the count rate of said up/down counter means attendant the conversion thereby of said output signals to digital counts.

8. In apparatus as in claim 7 wherein, said means to vary the count rate of said up/down counter means comprise, rate multiplier means operatively associated with said up/down counter means to control the count rate thereof, and means to vary the rate provided by the former in accordance with said calibration factor.

9. In apparatus as in claim 7 wherein, said means to determine said calibration factor for each of said sample analysis output signal channels comprise, means to apply a standard sample analysis output signal to said up/down counter means for conversion to a digital count, digital comparator means, and means to concomitantly apply standard sample data in the form of a digital count, and said standard output signal digital count from said up/down counter means to determine said calibration factor.

10. In apparatus as in claim 7 further comprising, variable gain amplifier means to amplify said sample analysis output signals, and means responsive to the respective magnitudes of said signals and operable to adjust the gain of said amplifier means for each of said channels to maintain all of said signals within a predetermined level range.

11. In apparatus as in claim 1 wherein, said means to determine said background signal for each of said sample analysis channels comprise, means to apply a sample analysis output signal of substantially zero magnitude to a said channel, and means to convert the resultant signal in said channel to digital form.

12. In apparatus as in claim 1 wherein, said means to determine said calibration factor for each of said analysis output signal channels comprise, means to apply a standard sample analysis output signal to said A/D converter means for conversion to digital form, digital comparator means, and means to concomitantly apply standard sample data and said standard sample analysis output signal to said digital comparator means to determine said calibration factor.

13. In apparatus as in claim 1 further comprising, variable gain amplifier means to amplify said sample analysis output signals, and means responsive to the respective magnitudes of said signals and operable to adjust the gain of said amplifier means for each of said channels to maintain all of said signals within a predetermined level range.

* * * * *